US012067319B2

(12) United States Patent
Sawata

(10) Patent No.: US 12,067,319 B2
(45) Date of Patent: *Aug. 20, 2024

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Naohiro Sawata, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 559 days.

This patent is subject to a terminal disclaimer.

(21) Appl. No.: 17/152,163

(22) Filed: Jan. 19, 2021

(65) Prior Publication Data

US 2022/0035589 A1    Feb. 3, 2022

(30) Foreign Application Priority Data

Jul. 29, 2020 (JP) ................................ 2020-128487

(51) Int. Cl.
*G06F 3/12* (2006.01)

(52) U.S. Cl.
CPC .......... *G06F 3/1275* (2013.01); *G06F 3/1204* (2013.01); *G06F 3/1243* (2013.01)

(58) Field of Classification Search
None
See application file for complete search history.

(56) References Cited

U.S. PATENT DOCUMENTS

| | | | |
|---|---|---|---|
| 2008/0306884 A1* | 12/2008 | Weinberg | G06F 3/1262 705/410 |
| 2009/0219571 A1* | 9/2009 | Saito | G06F 3/1204 358/1.15 |
| 2014/0356103 A1 | 12/2014 | Oki et al. | |
| 2017/0003923 A1* | 1/2017 | Hane | H04N 1/00411 |
| 2020/0081676 A1* | 3/2020 | Kayama | G06F 3/1282 |
| 2022/0035589 A1* | 2/2022 | Sawata | G06F 3/1243 |

FOREIGN PATENT DOCUMENTS

| | | |
|---|---|---|
| JP | 2014-232440 A | 12/2014 |
| JP | 2017-016315 A | 1/2017 |

\* cited by examiner

*Primary Examiner* — Helen Zong
(74) *Attorney, Agent, or Firm* — Oliff PLC

(57) ABSTRACT

An information processing device includes: a processor configured to: specify plural parts for manufacturing an ordered product; specify plural processes required from receiving an order of the product to completion of the product; for an intermediate part generated by processing at least two of the plural parts, generate an object indicating the intermediate part; for each of the plural parts, generate work objects indicating processes required for manufacturing the part, for a part to be manufactured by offset printing among the plural parts, generate work objects that treat printing plate parts corresponding to the number of plates obtained as a result of prepress as parts; and create workflow information that arranges and displays, the work objects indicating the processes required for manufacturing the part in an order of the plural processes, and relates and displays, for each of the plural parts, work objects indicating processes executed continuously, wherein in the workflow information, the intermediate object indicating the intermediate part is associated with the work objects for the at least two parts used to generate the intermediate part.

14 Claims, 12 Drawing Sheets

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-128487 filed Jul. 29, 2020.

BACKGROUND

(i) Technical Field

The present disclosure relates to an information processing device and a non-transitory computer readable medium.

(ii) Related Art

For example, JP-A-2017-16315 discloses a workflow creation support device that supports creation of a workflow for performing a printing operation. The workflow creation support device includes a job information acquiring unit that acquires job information including information on plural parameters for specifying contents of a job. The workflow creation support device includes a narrowing-down processing unit that uses information on at least a part of parameters of information on plural parameters acquired by the job information acquiring unit to narrow down templates that are selection candidates from plural templates registered in advance. The workflow creation support device includes a selection screen data creation unit that creates selection screen data used to display a selection screen on which information on the template narrowed down by the narrowing-down processing unit is displayed and a selection operation of allowing a user to select one template from the selection candidates is received. The workflow creation support device includes a job definition file creation unit that creates a job definition file based on the information on the selected one template by the selection operation and the information on the plural parameters.

SUMMARY

When process control is performed using a workflow for manufacturing a print product corresponding to a request, control corresponding to various specifications such as a print form and a manufacturing process of the print product is required. Thus, the workflow is individually created for each print product, and the process control is performed. However, the print products are a wide variety of print products including various specifications such as the printing form and the manufacturing process.

When offset printing is performed, it is necessary to create a printing plate. At this time, since a craftsman decides a size of the plate and page allocation, the required number of printing plates is only known after prepress. In a workflow in the related art, even when there are plural printing plates, such printing plates are managed as a single component. Therefore, it is difficult to control a progress as to how much printing plates have been created.

Aspects of non-limiting embodiments of the present disclosure relate to an information processing device and a non-transitory computer readable medium capable of more easily managing plural printing plates as compared to a case in which the plural printing plates are managed as a single component in offset printing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: a processor configured to: specify plural parts for manufacturing an ordered product; specify plural processes required from receiving an order of the product to completion of the product using the plural parts; for an intermediate part generated by processing at least two of the plural parts, generate an intermediate object indicating the intermediate part; for each of the plural parts, generate work objects indicating processes required for manufacturing the part, for a part to be manufactured by offset printing among the plural parts, generate work objects that treat printing plate parts corresponding to the number of printing plates obtained as a result of prepress as parts; and create workflow information that arranges and displays, for each of the plural parts, the work objects indicating the processes required for manufacturing the part in an order of the plural processes, and relates and displays, for each of the plural parts, work objects indicating processes executed continuously, wherein in the workflow information, the intermediate object indicating the intermediate part is associated with the work objects for the at least two parts used to generate the intermediate part.

BRIEF DESCRIPTION OF THE DRAWINGS

Exemplary embodiment(s) of the present disclosure will be described in detail based on the following figures, wherein.

DETAILED DESCRIPTION

Hereinafter, exemplary embodiments of the present disclosure will be described in detail with reference to the accompanying drawings. Elements and processing having the same operations, actions, and functions may be given the same reference signs throughout the drawings, and redundant description may be appropriately omitted. The drawings are merely schematic representations to facilitate understanding of the technique of the present disclosure. Therefore, the technique of the present disclosure is not limited only to illustrated examples. In the present exemplary embodiment, descriptions of a configuration that is not directly related to the present disclosure and a known configuration may be omitted.

In the present disclosure, a "product" conceptually includes a printed matter, a print product, a complex of plural similar or different printed matters, and an article (including the printed matter) at a dispatching stage. A "part" conceptually includes a part of elements constituting the "product". An "intermediate part" conceptually includes an article such as a product-in-process generated by processing at least two "parts" before the "product" is manufactured, that is, from when the product is ordered to when the product is completed. "Processing" conceptually includes not only processing of giving a deformation or a change to an article, but also processing of generating a combined article obtained by combining plural articles, and article processing of performing work on an article.

A "process" conceptually includes work to be executed from when the product is ordered to when the product is completed. The "process" includes minimum work to be executed from when the product is ordered to when the product is completed, as a unit. A "manufacturing process" conceptually includes a process of manufacturing parts in the product. A "work object" conceptually includes information indicating work at a time of a part manufacture such as plate making and printing. An "intermediate object" conceptually includes (i) work for parts and (ii) information on an intermediate part that is a deliverable of the work.

First Exemplary Embodiment

A printing operation of a print product including a printed matter includes, as main processes, order, production of an original, prepress (test printing), printing (final printing), processing, and dispatching.

Figure 1:
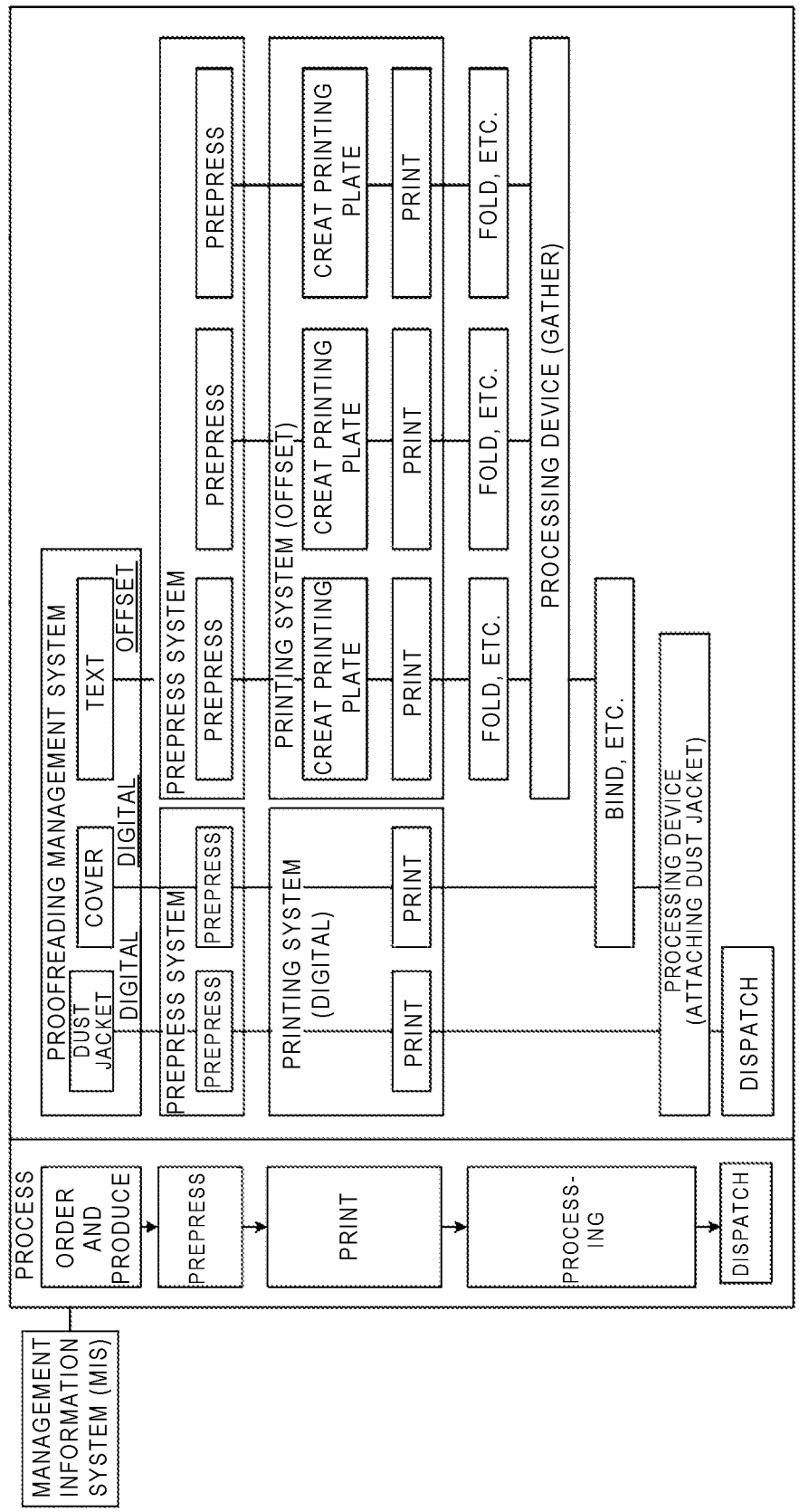
FIG. 1 is a schematic diagram of a process related to manufacture of a print product according to an exemplary embodiment.

FIG. 1 illustrates a schematic example of a process related to manufacture of a print product according to the exemplary embodiment.

FIG. 1 illustrates a case in which the print product is, for example, formed of parts of a dust jacket, a cover, and a text, the parts of the jacket and the cover are formed by digital printing, and the part of the text is formed by offset printing.

An order and production process is a process of receiving an order for manufacture of a print product from a requester and producing electronic data of an original for printing. Processing in the order and production process is performed by, for example, a proofreading management system.

A "prepress process" is used as a general term for processes before the print product is printed. For a generally submitted original, the prepress process may include processes such as design, phototypesetting, formation, artwork creation, color separation, retouching, stripping, and printing plate making. Test printing may be performed if necessary, and the prepress process may be used to confirm quality of a printing result. Based on the result of the test printing, it is determined whether it is necessary to correct (proofread) original data. When the printing result does not meet a request of the requester, the proofreading is performed. Processing in the prepress process is performed by, for example, a prepress system.

When the result of the test printing by the prepress meets the request of the requester, a process proceeds to a printing process.

The printing process is a process of printing on paper or another printing medium based on design data for the printing. The printing process may include a process of creating a printing plate based on the design data for the printing. When the offset printing is performed, the printing is performed on the paper or the other printing medium using the printing plate created based on the design data for the printing. When the digital printing known as computer to plate (CTP) printing is performed by a digital printing device, it is not necessary to prepare the printing plate. The "printing device" conceptually includes a printing machine, a printer, an image forming device, an image recording device, and the like. Processing in the printing process is performed by, for example, a printing system.

A processing process is a process of performing various processing on printed parts and printed products. Here, the term "processing" is, for example, a general term for various processing performed on the printed matter that has been printed. Specific examples of the processing include cutting processing, folding processing, gathering processing, binding processing, special processing, surface processing, bookbinding processing, and the like. The processing is not limited to one type, and plural processing may be combined. Through the processing process, the print product is arranged into a book, a magazine, a pamphlet, a catalog, or other product forms. Processing in the processing process is performed by, for example, a processing device.

A dispatching process is a process of dispatching a manufactured print product including plural parts to the requester.

A workflow is used to efficiently operate and manage such a series of printing operations.

In the present exemplary embodiment, when the manufacture of the product is managed using the workflow from the manufacturing request to the completion of the print product, the workflow is individually created for each of a wide variety of print products, and process control is performed. However, during manufacturing of a print product including plural parts, an intermediate part may be generated. In this case, when the manufacturing process is managed from the manufacturing request to the completion of the print product, it is difficult to easily know which parts constitute each intermediate part.

When offset printing is performed, it is necessary to create a printing plate. At this time, since a craftsman decides a size of the plate and page allocation, the required number of printing plates is only known after prepress. In a workflow in the related art, even when there are plural printing plates, such printing plates are managed as a single component. Therefore, it is difficult to control a progress as to how much printing plates have been created.

Therefore, in the present exemplary embodiment, plural parts for manufacturing an ordered print product are specified, and plural processes required from receiving the order of the print product to completion of the print product are specified. For an intermediate part generated by processing at least two of the plural parts, an intermediate object indicating the intermediate part is generated. For each of the plural parts, work objects indicating processes required for manufacturing the part are generated. In the present exemplary embodiment, for parts manufactured by the offset printing among the plural parts, work objects that treat printing plate parts corresponding to the number of printing plates obtained as a result of the prepress as parts are generated. Then, workflow information is created. The workflow information displays, for each of the plural parts, the work objects indicating the processes required for manufacturing the part in an order of the plural processes, and relates and displays the work objects indicating the processes executed continuously. In the workflow information, each intermediate object indicating the intermediate part is associated with the work objects for the at least two parts used to generate the intermediate part.

Figure 2:
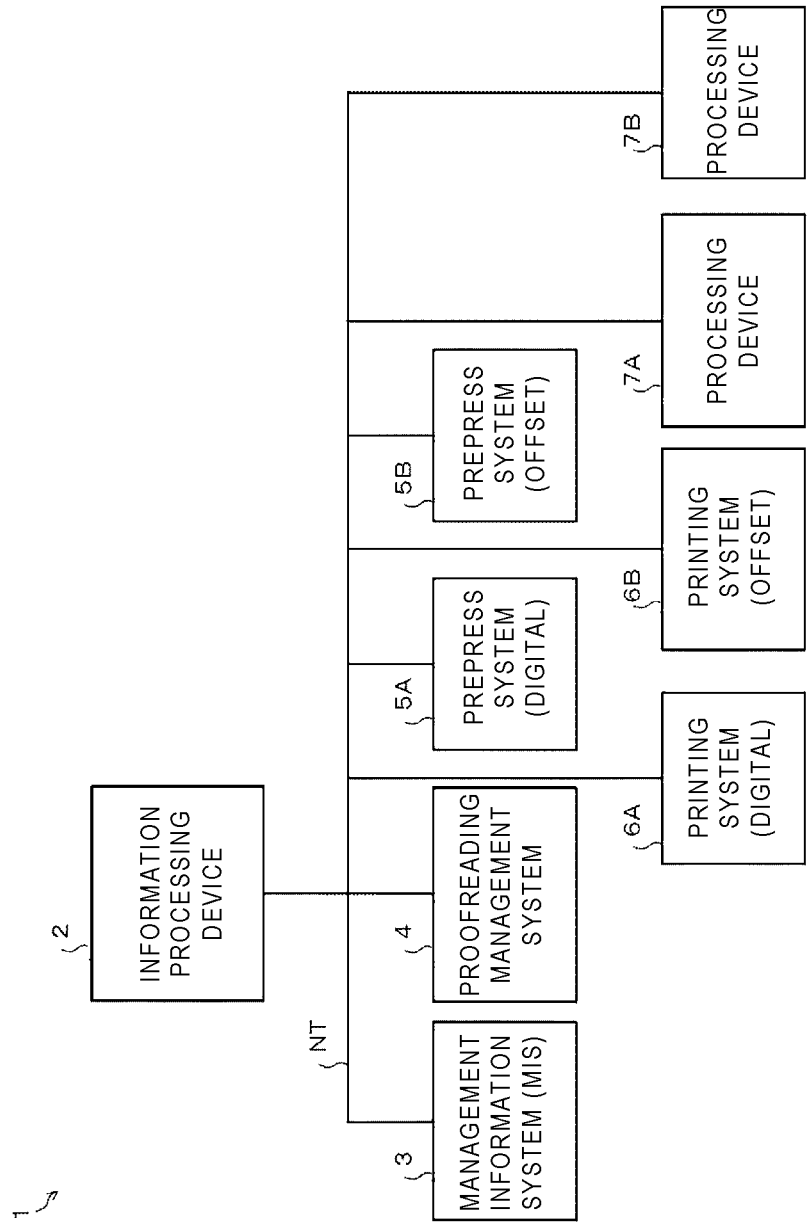
FIG. 2 illustrates a schematic configuration of a print network system according to the exemplary embodiment.

FIG. 2 illustrates a schematic configuration of a printing network system 1 according to an exemplary embodiment for performing a technique of the present disclosure.

As illustrated in FIG. 2, the printing network system 1 includes an information processing device 2, a management information system 3, a proofreading management system 4, a prepress system 5A, a prepress system 5B, a printing system 6A, a printing system 6B, a processing device 7A, and a processing device 7B. The information processing device 2, the management information system 3, the proofreading management system 4, the prepress system 5A, the prepress system 5B, the printing system 6A, the printing system 6B, the processing device 7A, and the processing device 7B are connected to a network NT, and exchange information with each other. For example, the Internet, a local area network (LAN), and a wide area network (WAN) are applied to the network NT.

The information processing device 2 is a computer system having a workflow creation support function that supports creation of a workflow for performing printing operation. For example, a general-purpose computer device such as a server computer or a personal computer (PC) is applied to the information processing device 2.

The management information system (hereinafter referred to as "MIS") 3 is a computer system that manages printing-related management information, and performs production process control and inventory control for the print products. The management information may include, for example, various information such as order information, estimation information, sales information, a management plan, and inventory information. The present exemplary embodiment describes, for example, a case in which the MIS 3 transmits information necessary for manufacturing the print product in an extensible markup language (XML) format. The MIS 3 may use information such as a job definition format (JDF) and a job messaging format (JMF).

The proofreading management system 4 is a computer system that receives an order for manufacture of a print product from the requester and produces and proofreads electronic data of an original for printing. The proofreading management system 4 outputs data indicating the original of the print product.

The prepress systems 5A and 5B are computer systems that perform the test printing before the print product is printed and confirm the quality of the printing result. For example, a system including a digital printing device that performs the printing without using the printing plate is applied to the prepress system 5A. For example, a system including an offset printing device that performs the printing without using the printing plate is applied to the prepress system 5B.

The printing systems 6A and 6B are computer systems that process the printing on paper or other printing medium based on the design data for the printing. For example, the system including the digital printing device that performs the printing without using the printing plate is applied to the printing system 6A. For example, the system including the offset printing device that performs the printing without using the printing plate is applied to the printing system 6B.

The processing devices 7A and 7B are devices that perform various processing on the parts and the product. For example, a dust jacket attaching device that attaches a dust jacket to a product for which forming of parts constituting the product are completed is applied to the processing device 7A. For example, a gathering device that gathers parts that are subjected to the offset printing and the folding processing is applied to the processing device 7B.

The printing operation of the print product is not limited to the above-described systems and devices, and may include other systems and other devices that may be used in the printing operation. For example, the printing operation may include a print-ready plate management system that allows the requester of the print product to confirm print contents known as a print-ready plate, and confirm, approve and request to proceed to a printing execution stage.

Figure 3:
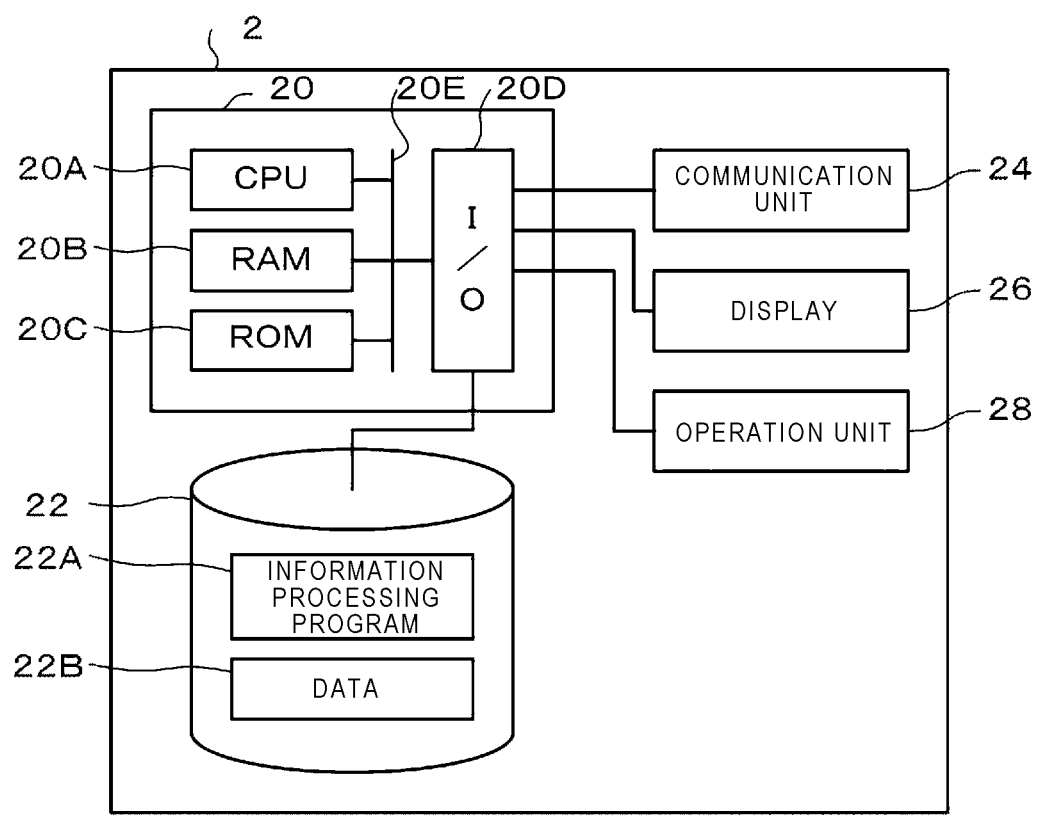
FIG. 3 is a block diagram illustrating an example of an electrical configuration of an information processing device according to the exemplary embodiment.

FIG. 3 is a block diagram illustrating an example of an electrical configuration of the information processing device 2 according to the present exemplary embodiment.

As illustrated in FIG. 3, the information processing device 2 according to the present exemplary embodiment includes a controller 20, a storage 22, a communication unit 24, a display 26, and an operation unit 28.

The controller 20 includes a central processing unit (CPU) 20A, a random access memory (RAM) 20B, a read only memory (ROM) 20C, and an input and output interface (I/O) 20D, which are connected with each other via a bus 20E. Here, the CPU 20A is an example of a processor.

Each of functional units including the storage 22, the communication unit 24, the display 26, and the operation unit 28 is connected to the I/O 20D. These functional units can communicate with the CPU 20A via the I/O 20D.

The controller 20 may be configured as a sub controller that controls a part of operations of the information processing device 2, or may be configured as a part of a main controller that controls an entire operation of the information processing device 2. For example, an integrated circuit (IC) such as a large scale integration (LSI) or an IC chipset is used for a part or all of each block of the controller 20. An individual circuit may be used for each block, or a circuit in which a part or all of the blocks are integrated may be used. The blocks may be provided integrally, or a part of the blocks may be provided separately. In each block, a part of the block may be provided separately. The controller 20 may be integrated in the LSI but also in a dedicated circuit or a general-purpose processor.

An auxiliary storage device such as a hard disk drive (HDD), a solid state drive (SSD), and a flash memory may be used as the storage 22. An information processing program 22A for implementing information processing according to the present exemplary embodiment and data 22B are stored in the storage 22. The CPU 20A reads the information processing program 22A from the storage 22, loads the information processing program 22A into the RAM 20B, and executes processing. Accordingly, the information processing device 2 that executes the information processing program 22A operates as an information processing device of the present disclosure. The information processing program 22A may be stored in the ROM 20C.

The information processing program 22A may be installed, for example, in advance in the information processing device 2. The information processing program 22A may be stored in a non-volatile storage medium or may be distributed via the network NT, and appropriately installed in the information processing device 2. Examples of the non-volatile storage medium include a compact disc read only memory (CD-ROM), a magnetooptical disc, an HDD, a digital versatile disc read only memory (DVD-ROM), a flash memory, a memory card, and the like.

The display 26 uses, for example, a liquid crystal display (LCD) or an electro luminescence (EL) display. The display 26 may include a touch panel integrally. The operation unit 28 is provided with a device for operation input such as a keyboard and a mouse. The display 26 and the operation unit 28 receive various instructions from a user of the information processing device 2. The display 26 displays various information such as a result of processing executed according to the instruction received from the user and a notification of the processing.

The communication unit 24 is connected to the network NT such as the Internet, the LAN, and the WAN, and can communicate with an external device via the network NT.

Figure 4:
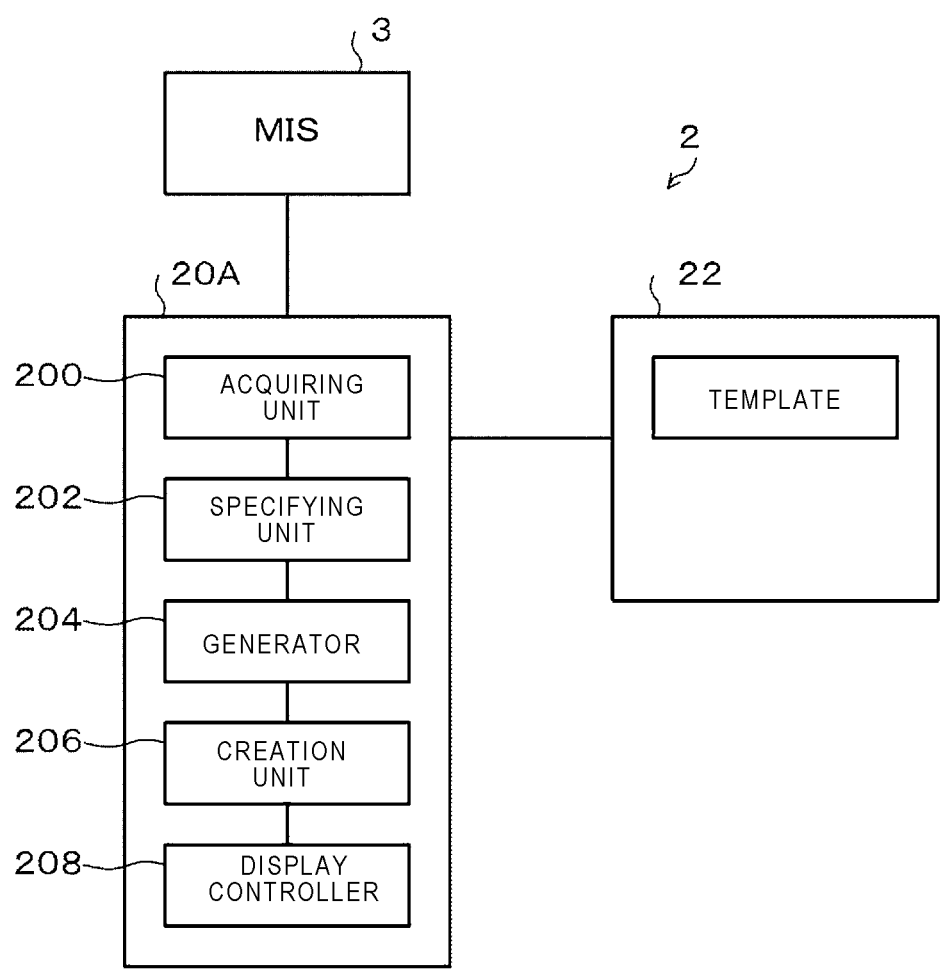
FIG. 4 is a block diagram illustrating an example of a functional configuration of the information processing device according to the exemplary embodiment.

FIG. 4 is a block diagram illustrating an example of a functional configuration of the information processing device 2 according to the present exemplary embodiment.

As illustrated in FIG. 4, the CPU 20A of the information processing device 2 includes functional units that function as an acquiring unit 200, a specifying unit 202, a generator 204, a creation unit 206, and a display controller 208.

The storage 22 according to the present exemplary embodiment stores template information applicable to the workflow information indicating the workflow of the print product (hereinafter referred to as "product workflow information"). The workflow of the print product may be referred to as a "product workflow". The template information is data in which for each process in manufacturing the print product, information indicating a unit of work performed in the process and parts processed and generated in the process are regarded as nodes, and a relationship between plural processes is regarded as a link between the nodes. For example, according to various conditions such as each type of the print product, each customer, and each condition of finishing of the print product, a process performed for manufacturing the print product, the part processed or generated in each process, and the relationship between the processes or a relationship between each process and the parts may be set as templates. For example, according to the exemplary embodiment, plural templates may be registered in advance for each assumed print product and an appropriate template is set according to a specification of an ordered print product from the registered plural templates. Thereby, the template can be used to set the process for manufacturing the print product. As a specific example, the plural templates are created in advance, the plural templates are stored in the storage 22, and the user may set, for example, an appropriate template from the plural templates stored in the storage 22 to use the set template. When the template is used in this way, the process for manufacturing the print product can be more easily set as compared with a case in which a relationship among (i) processes required for manufacturing the print product, (ii) the part processed in each process, and (iii) a next process for integrating the processed parts is designed from a beginning each time the print product is ordered.

Figure 5:
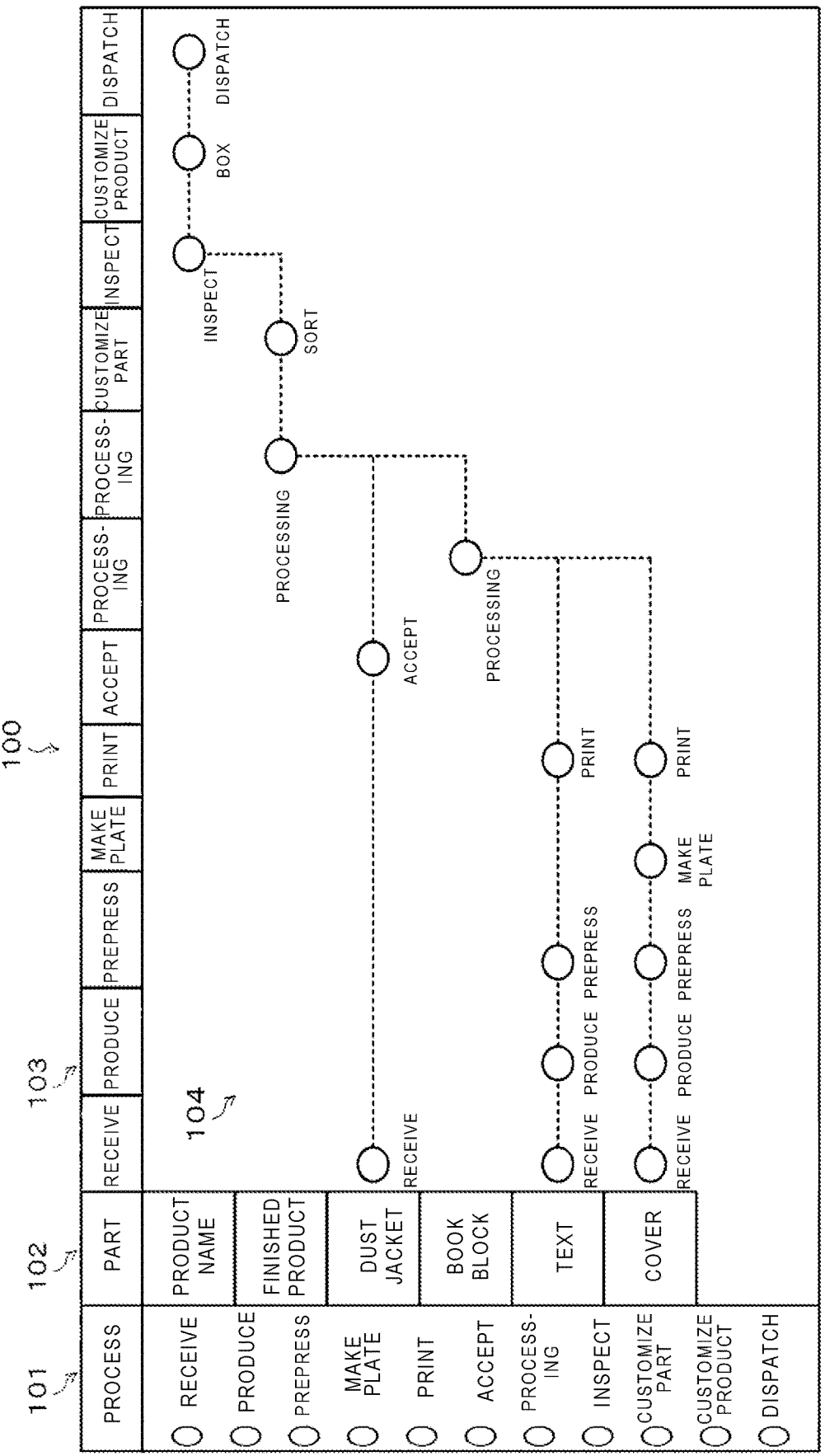
FIG. 5 illustrates an example of template information according to the exemplary embodiment.

FIG. 5 illustrates an example of the template information according to the present exemplary embodiment.

FIG. 5 illustrates the screen 100 as an example of the template information displayed on the display 26. The display controller 208 performs control of displaying a screen 100 on the display 26 using the template information.

The screen 100 includes display regions 101, 102, 103, and 104. The process in manufacturing the print product is displayed in the display region 101. The process illustrated in FIG. 5 is an example of work from receiving the order of the print product to dispatch of the print product, in manufacturing of the print product.

For example, "receive" indicates a work of receiving the request from the requester to manufacture at least a part of the print product. "Produce" indicates work of producing the original of the print product. "Prepress" indicates a work of performing the test printing before printing the print product. "Make plate" indicates a work of creating the printing plate for the printing. "Print" indicates a work of printing on the printing medium. "Accept" indicates a work of receiving the part or the product. "Process" indicates a work of performing processing on the printed matter. "Inspect" indicates a work of inspecting the part or the product. "Customize part" indicates a general term for works of performing a special process and processing on the part. "Customize product" indicates a general term for works of performing a special process and processing on the part. "Dispatch" indicates a work of dispatching a print product that has been manufactured.

The display region 102 displays the parts of the print product. In the example illustrated in FIG. 5, displayed are (i) the parts included in the print product and (ii) the intermediate parts generated from the parts during manufacture of the print product. As examples of the part included in the print product, the "cover", the "text", and the "dust jacket" are illustrated. As examples of the intermediate part, a "book block" generated by combining the "cover" and the "text" and a "finished product" generated by combining the "book block" and the "dust jacket" are illustrated. The printed matter at a stage where the production is completed is illustrated as a "product name".

The display region 103 displays the works of the manufacturing process in manufacturing the print product. Information displayed in the display region 103 corresponds to the processes displayed in the display region 101.

The display region 104 displays the works in manufacturing the print product as nodes (circular figures in FIG. 5). That is, the work objects indicating the works in the processes from the "receive" to the "dispatch" displayed in the display region 101 are displayed as the nodes (circular figures in FIG. 5) in an order of the processes in manufacturing the print product. Among the work objects, the nodes indicating the works for the intermediate parts function as the intermediate objects.

For each of the plural parts, the nodes which are the work objects indicating the works included in the manufacturing process of the part are arranged in order of the works and displayed. The nodes indicating the work objects which are processed continuously are related such that the nodes have a relationship therebetween. FIG. 5 illustrates an example in which the nodes are related by connecting the nodes with dotted lines. A node that is an intermediate object indicating an intermediate part and nodes that are other work objects for plural parts used for generating the intermediate part are related (connected to each other) such that the node which is the intermediate object has a relationship with the nodes which are the other work objects.

Regarding the template information, plural pieces of template information are created in advance according to the number of parts constituting the print product and types of the processing. The plural pieces of template information are stored in the storage 22. Each of the plural pieces of template information is stored in association with identification information for identifying the template information. The identification information indicates, for example, a "workflow ID (IDentification)" and a "workflow name". Different identification information are allocated to the respective plural pieces of template information. That is, the template information is managed in association with the workflow ID and the workflow name.

The acquiring unit 200 acquires manufacturing information for manufacturing the print product.

In the present exemplary embodiment, for example, the information processing device 2 acquires information (hereinafter referred to as "MIS information") necessary for manufacturing the print product, from the MIS 3. The MIS information is, for example, information described in the XML format. The MIS information includes, for example, various information such as the workflow ID indicating the product workflow information of the print product, a part type ID indicating the part constituting the print product, and information indicating the part and a process such as processing performed on the print product. The processes and the work objects in manufacturing the print product may be specified based on the MIS information.

The specifying unit 202 specifies a type (pattern) of the manufacturing process using the MIS information acquired from the MIS 3. Here, the type (pattern) of the manufacturing process is information for specifying the manufacturing process by combining part information such as the number of parts included in the print product and information indicating the manufacturing process of each part. That is, the specifying unit 202 uses the MIS information to specify (i) the plural processes required from receiving the order of the print product to completion of the print product and (ii) the plural parts for manufacturing the print product.

The generator 204 generates the work objects and the intermediate objects indicating the works in manufacturing the print product based on the type of the manufacturing process specified by the specifying unit 202. Specifically, for each of the plural parts included in the print product, the work objects indicating the works including the processing performed to manufacture the part is generated. For the parts manufactured by the offset printing among the plural parts, work objects that treat printing plate parts corresponding to the number of printing plates obtained as a result of the prepress as parts are generated. For the intermediate part generated by performing processing such as combining at least two parts among the plural parts, the intermediate object indicating the intermediate part is generated.

The creation unit 206 creates the product workflow information in which the work object and the intermediate object are related (connected), using the MIS information acquired from the MIS 3 and the work object and the intermediate object which are generated by the generator 204.

The creation unit 206 has an editing function of creating the product workflow information and changing a part of the product workflow information. The editing function will be described later.

The present exemplary embodiment describes a case in which the generator 204 and the creation unit 206 acquire, from the storage 22, template information matching the MIS information acquired from the MIS 3, to thereby generate the work object and the intermediate object and create the workflow of the print product. Specifically, among the MIS information acquired from the MIS 3, the template information matching the information indicating the type of the manufacturing process, that is, the number of parts included in the print product and the manufacturing process of each part is acquired from the storage 22.

When the plural pieces of template information match the MIS information acquired from the MIS 3, the plural pieces of template information may be used as candidate template information, and any one of the plural pieces of candidate template information may be selected.

The display controller 208 creates display information for displaying the product workflow information created by the creation unit 206 on the display 26, and performs control of displaying the created display information on the display 26.

The display controller 208 can perform display control of displaying the information obtained in each of the functional units including the acquiring unit 200, the specifying unit 202, the generator 204, and the creation unit 206, on the display 26.

Next, an action of the information processing device 2 will be described with reference to FIG. 6.

Figure 6:
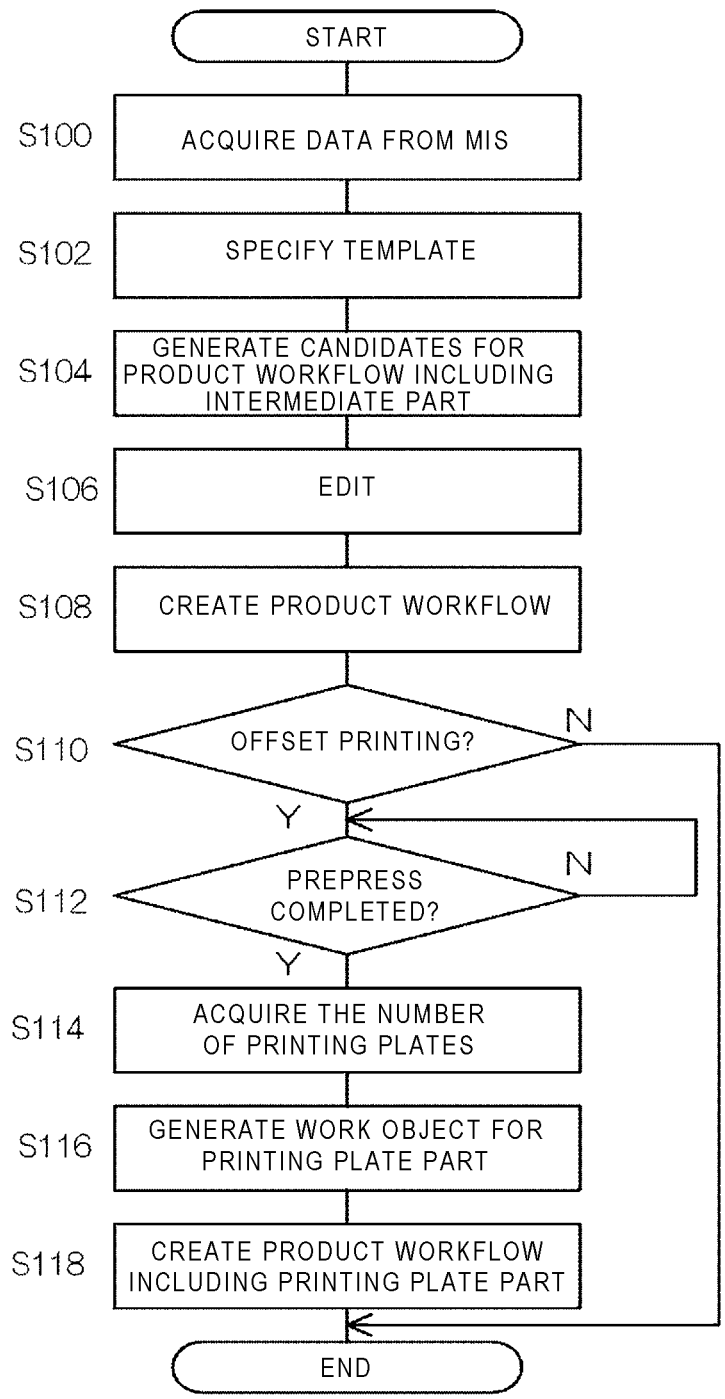
FIG. 6 is a flowchart of an example of an information processing program according to the exemplary embodiment.

FIG. 6 is a flowchart of an example of the information processing program 22A executed on the information processing device 2.

In the information processing device 2, when it is instructed to start the information processing program 22A, the CPU 20A functions as each of the functional units described above and executes the following steps.

In step S100 of FIG. 6, the acquiring unit 200 acquires the MIS information from the MIS 3. The MIS information is the information described in the XML format as described above. The MIS information includes information on the parts and the manufacturing processes in manufacturing the print product.

Next, an example of the MIS information will be illustrated.

```
<product_template_attributes>
        <product_wf_template_id>WFID_020</product_wf_template_id>
    <part_template_attributes>
        <part_type_id>ID020_1_1</part_seq>
        +attribute information of each process
    </part_template_attributes>
</product_template_attributes>
...
```

60

Figure 9:
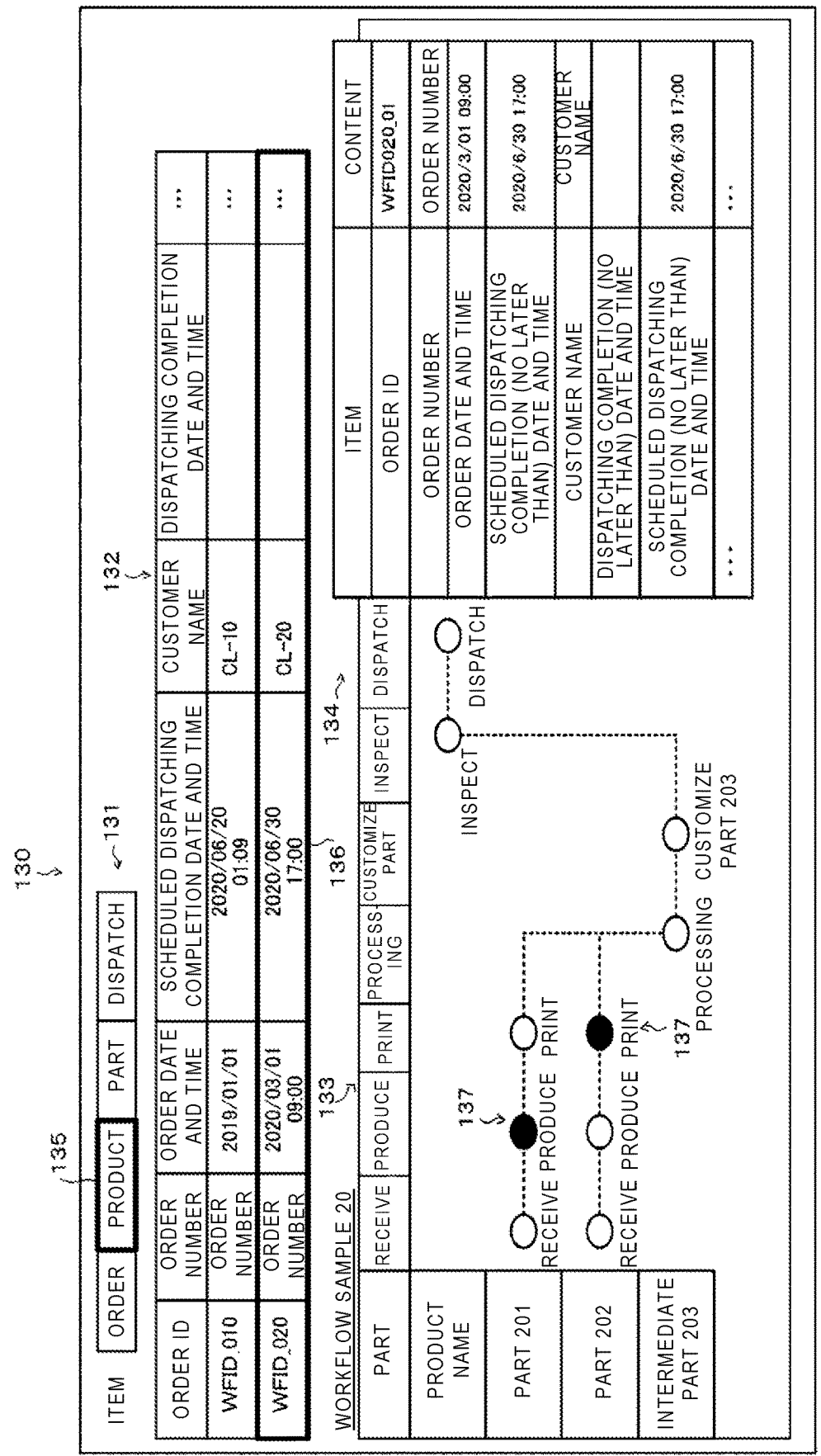
FIG. 9 illustrates an example of workflow information of the print product according to the exemplary embodiment.

The MIS information indicates that the workflow ID of the template information indicating the template specified for the print product is "WFID_020" (also see FIG. 9). The part included in the template information is "ID020_1_1". Details of each process for the part, that is, a work object is indicated as "attribute information of each process".

In step S102, the specifying unit 202 specify the type of the manufacturing process using the MIS information to specify the template information for generating the candidate product workflow information. In step S102, the workflow ID included in the MIS information is detected, and the template information is specified based on the detected workflow ID. The specified template information is an example of a "matching template" of the present disclosure.

In step S104, the generator 204 and the creation unit 206 generate a candidate for a product workflow (product workflow information) including the intermediate part. The candidate for the product workflow may be referred to as a "product workflow candidate". In step S104, first, the generator 204 generates the work object and the intermediate object which indicate the works in manufacturing the print product based on the specified type of the manufacturing process. Then, the creation unit 206 uses the MIS information, the work objects, and the intermediate object to generate a candidate for the product workflow including the intermediate part in which the work objects and the intermediate object are connected.

Specifically, the template information matching the workflow ID included in the MIS information is acquired from the storage 22, to generate the work objects and the intermediate object, and create the product workflow candidate in which the nodes are connected.

Figure 7:
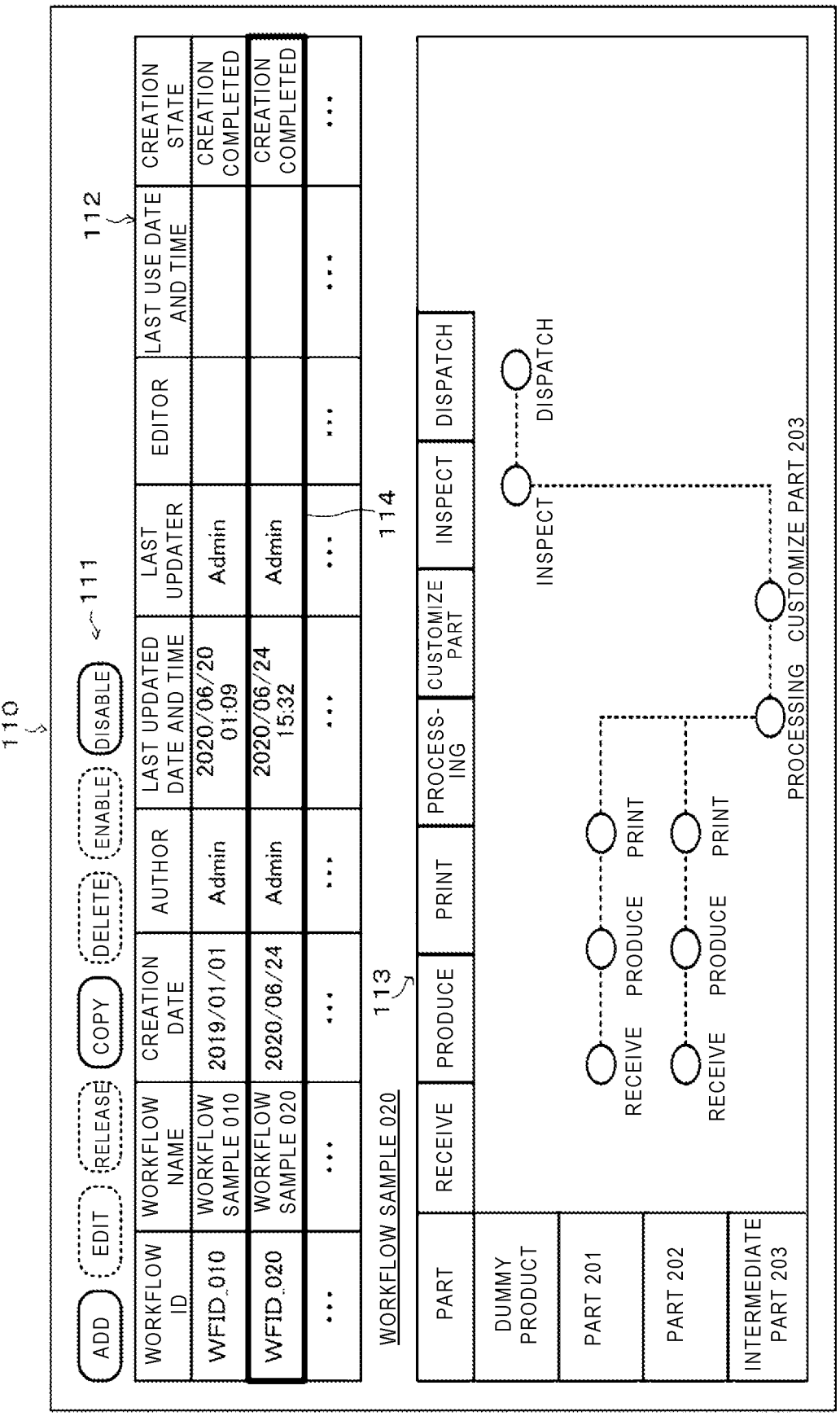
FIG. 7 illustrates an example of the template information according to the exemplary embodiment.

FIG. 7 illustrates an example of the template information that is the product workflow candidate.

FIG. 7 illustrates the screen 110 as an example of the template information displayed on the display 26. The display controller 208 performs control of displaying a screen 100 on the display 26 using the template information.

The screen 110 includes display regions 111, 112, and 113. The display region 111 displays instruction buttons for creating the product workflow. In the example illustrated in FIG. 7, the instruction buttons of "add", "edit", "release", "copy", "delete", "enable", and "disable" are displayed. These instruction buttons are instructed by an operation of the user of the operation unit 28.

The "add" instruction button is a button for instructing to add a new product workflow. The "edit" instruction button is a button for instructing a start of editing an existing product workflow. The "release" instruction button is a button for instructing release of editing the product workflow being edited. The "copy" instruction button is a button for instructing to copy an existing product workflow to create the same workflow. The "delete" instruction button is a button for instructing to delete a selected product workflow. The "enable" instruction button is a button for setting a selected product workflow to an enabled state. The "disable" instruction button is a button for setting a selected product workflow from the enabled state to a disabled state.

The display region 112 displays a list of the template information stored in the storage 22. In the list of the example illustrated in FIG. 7, various information included in the template information including the workflow ID and the workflow name for identifying the template information are associated with labels indicating items.

Similar to FIG. 5, the display region 113 displays the respective works of the manufacturing process in the selected template information. Specifically, the work objects in the selected template information (information in a region surrounded by a thick frame line 114 in the display region 112) are displayed as the nodes (circular figures). Among the work objects, the nodes indicating the works for the intermediate parts function as the intermediate objects. In this case, the intermediate object includes an intermediate processing object and an intermediate work object. The intermediate processing object indicates the processing for the plural parts ("processing" in the example of FIG. 7). The intermediate work object indicates processing for the generated intermediate part ("customize part 203" in the example of FIG. 7).

In step S106, the creation unit 206 performs edit processing on the product workflow candidate. Specifically, when any of the instruction buttons illustrated in FIG. 7 is instructed by the user operating the operation unit 28, the processing of step S106 is started. For example, when the edit button is instructed, processing of editing to change a part of the product workflow candidates is started.

Figure 8:
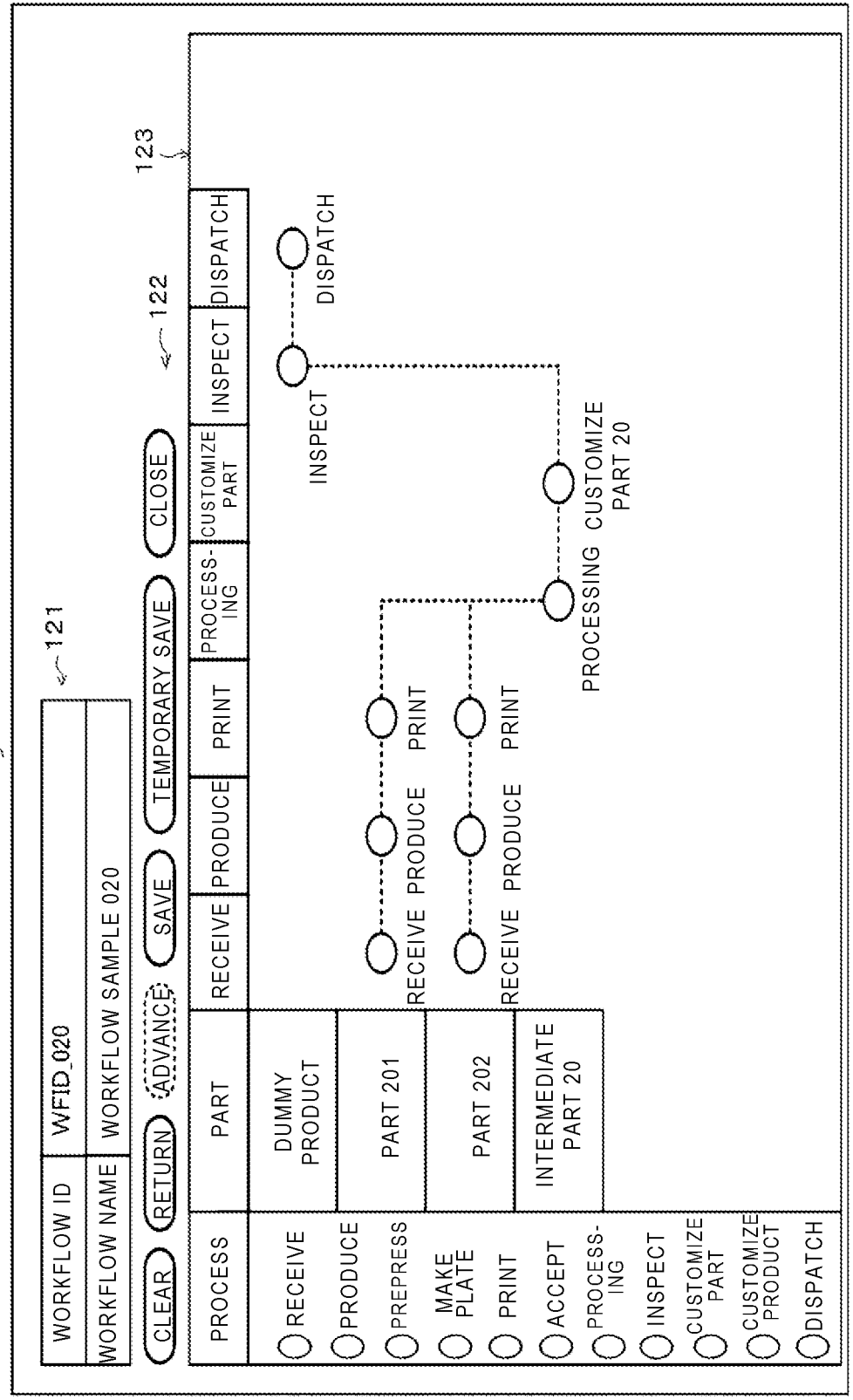
FIG. 8 illustrates an example of a screen in edit processing according to the exemplary embodiment.

FIG. 8 illustrates an example of a screen in the edit processing.

FIG. 8 illustrates, as an example, a screen 120 in which the edit button is instructed to edit and change a part of the product workflow candidate. The display controller 208 performs control of displaying the screen 120 on the display 26 during the editing.

The screen 120 includes display regions 121, 122, and 123. The display region 121 displays the workflow ID and the workflow name that indicate template information being edited (that is, the product workflow candidate).

The display region 122 displays instruction buttons for instructing an editing status for the template information being edited. In the example illustrated in FIG. 8, the instruction buttons of "clear", "return", "advance", "save", "temporary save", and "close" are displayed. These instruction buttons are instructed by an operation of the user of the operation unit 28.

The "clear" instruction button is a button for instructing to delete processing (editing operation) performed on the product workflow candidate being edited. The "return" instruction button is a button for instructing to cancel a previously processed editing operation and return to a previous state. The "advance" instruction button is a button for instructing to return the canceled editing operation from a state returned by the "return" instruction button. The "save" is a button for instructing to save the product workflow candidate, that is, to store the product workflow candidate in the storage 22 in a current editing work state. The "temporarily save" instruction button is a button for instructing to temporary save the product workflow candidate in the RAM 20B in the current editing work state. The "close" instruction button is a button for instructing to close the screen 120 after finishing the edit processing of the product workflow candidate being edited.

Similar to FIG. 5, the display region 123 displays the work objects in the template information being edited as the nodes (circular figures). Among the work objects, the nodes indicating the works for the intermediate parts function as the intermediate objects.

In the edit processing, any of the work objects displayed in the display region may be deleted and any of the work objects displayed in a process column may be added (for example, drag a figure).

Next, in step S108, the creation unit 206 creates the edited product workflow candidate as a product workflow. That is, when the "close" instruction button illustrated in FIG. 8 is instructed and saving is completed, the product workflow information indicating the product workflow candidate is created. The created product workflow information is stored in the storage 22.

FIG. 9 illustrates an example of the product workflow information.

FIG. 9 illustrates a screen 130 as an example of the product workflow information displayed on the display 26.

The display controller 208 performs control of displaying the product workflow information on the display 26. By this control, for example, an image of the screen 130 is displayed on the display 26.

The screen 130 includes display regions 131, 132, 133, and 134. The display region 131 displays instruction buttons related to a state of the product workflow being displayed. In the example illustrated in FIG. 9, the instruction buttons of "order", "product", "part", and "dispatch" are displayed. These instruction buttons are instructed by an operation of the user of the operation unit 28.

The "order" instruction button indicates an instruction button for instructing to display a product workflow in which a manufacturing state of a print product is an ordering stage. The "product" instruction button indicates an instruction button for instructing to display a product workflow of a print product. The "part" instruction button indicates an instruction button for instructing to partially display parts in a product workflow of a print product. The "dispatch" instruction button indicates an instruction button for instructing to display a product workflow in which the manufacturing stage of a print product is a dispatching stage.

The product workflow information read from the storage 22 in accordance with an instruction button instructed in the display region 131 is displayed in a list form in the display region 132. The list in the example illustrated in FIG. 9 displays product workflow information corresponding to the instructed instruction button (specifically, the instruction button indicating the "product" surrounded by a thick frame line 135 in the display region 131).

Similar to FIG. 5, the display region 133 displays work objects corresponding to an instructed product workflow (specifically, the product workflow information surrounded by a thick frame line 136 in the display region 132) as nodes (circular figures). Among the work objects, the nodes indicating the works for the intermediate parts function as the intermediate objects.

Specifically, in the product workflow information in the example illustrated in FIG. 9, nodes (work objects) in a manufacturing process of each of a part 201 and a part 202 are generated. Nodes (intermediate objects) in intermediate processes of an intermediate part 203 that is a product-in-process obtained by combining the part 201 and the part 202 are generated. Then, the process continues to a node indicating an inspection process and a node indicating a dispatching process in order. Therefore, the product workflow information is created in which from the receiving process to the dispatching process, the nodes (working objects) in the manufacturing process of each of the part 201 and the part 202 and the nodes (intermediate objects) of the inter- mediate processes of the intermediate part 203 are connected.

The display region 134 displays the MIS information acquired from the MIS 3. FIG. 9 illustrates a case where a table in which information indicating "items" and "details" are associated with each other is displayed as a display example of the MIS information.

The product workflow information is displayed together with work status information indicating a progress status of a work which is based on the current product workflow information, in cooperation with the MIS information in the MIS 3. Specifically, the display controller 208 performs control of displaying a progress level of each of the work objects indicated by the MIS information on the display 26.

The display region 133 in FIG. 9 illustrates a case in which for the print product and the parts, the print product is indicated by a "product name", and the parts are indicated by the "part 201", the "part 202", and the "intermediate part 203". In this case, as the work status information, a display form of a node corresponding to a current progress state is changed. For example, when the MIS information provided from the MIS 3 includes information that the part 201 is in a production stage and the part 202 is in a printing stage, each node is displayed in a different display form from the other nodes. Specifically, the node indicating the production process of the part 201 and the node indicating the printing process of the part 202 have a display form 137 (a display form with a black circular figure) different from that of the other nodes. At this stage, the intermediate part 203 is generated by combining the part 201 and the part 202. Therefore, it is possible to confirm that the intermediate part 203 has not been generated. By changing the display form of the node in this way, it is possible to confirm the progress state of the work in the workflow of the print product.

Examples of changing the display form of the node as described above include changing a shape of an image that is displayed as the node, changing a color of the node, and changing the node by adding an annotation image.

As described above, (i) the plural manufacturing processes from the order of the print product to the completion of the print product and (ii) the plural parts are specified, and for the intermediate part generated by processing parts, the intermediate object indicating the intermediate part is generated. Then, the product workflow information is created in which the work objects are arranged in order of the works and displayed, the work objects indicating the works processed continuously are connected and displayed, and the intermediate object and the work objects are connected and displayed. Accordingly, when the manufacturing process is managed from the order of the print product to the completion of the print product, it is possible to easily know which parts constitute the intermediate part.

Next, in step S110, the creation unit 206 determines whether there is a part to be offset printed. When it is determined that there is the part to be offset printed (in a case of an affirmative determination), the process proceeds to step S112. When it is determined that there is no part to be offset printed (in a case of a negative determination), a series of processing by the information processing program 22A ends.

In step S112, the creation unit 206 determines whether the prepress is completed for the part to be offset printed. When it is determined that the prepress is completed (in a case of an affirmative determination), the process proceeds to step S114. When it is determined that the prepress is not completed (in a case of a negative determination), the process waits in step S112.

In step S114, the creation unit 206 acquires the number of printing plates obtained as a result of the prepress.

In step S116, the creation unit 206 generates work objects that treats the printing plate parts corresponding to the number of printing plates acquired in step S114 as parts.

In step S118, the creation unit 206 creates a product workflow including the printing plate parts, and ends the series of processing by the information processing program 22A.

Next, a method of managing the plural printing plate parts will be specifically described with reference to FIGS. 10 to 11B.

Figure 10:
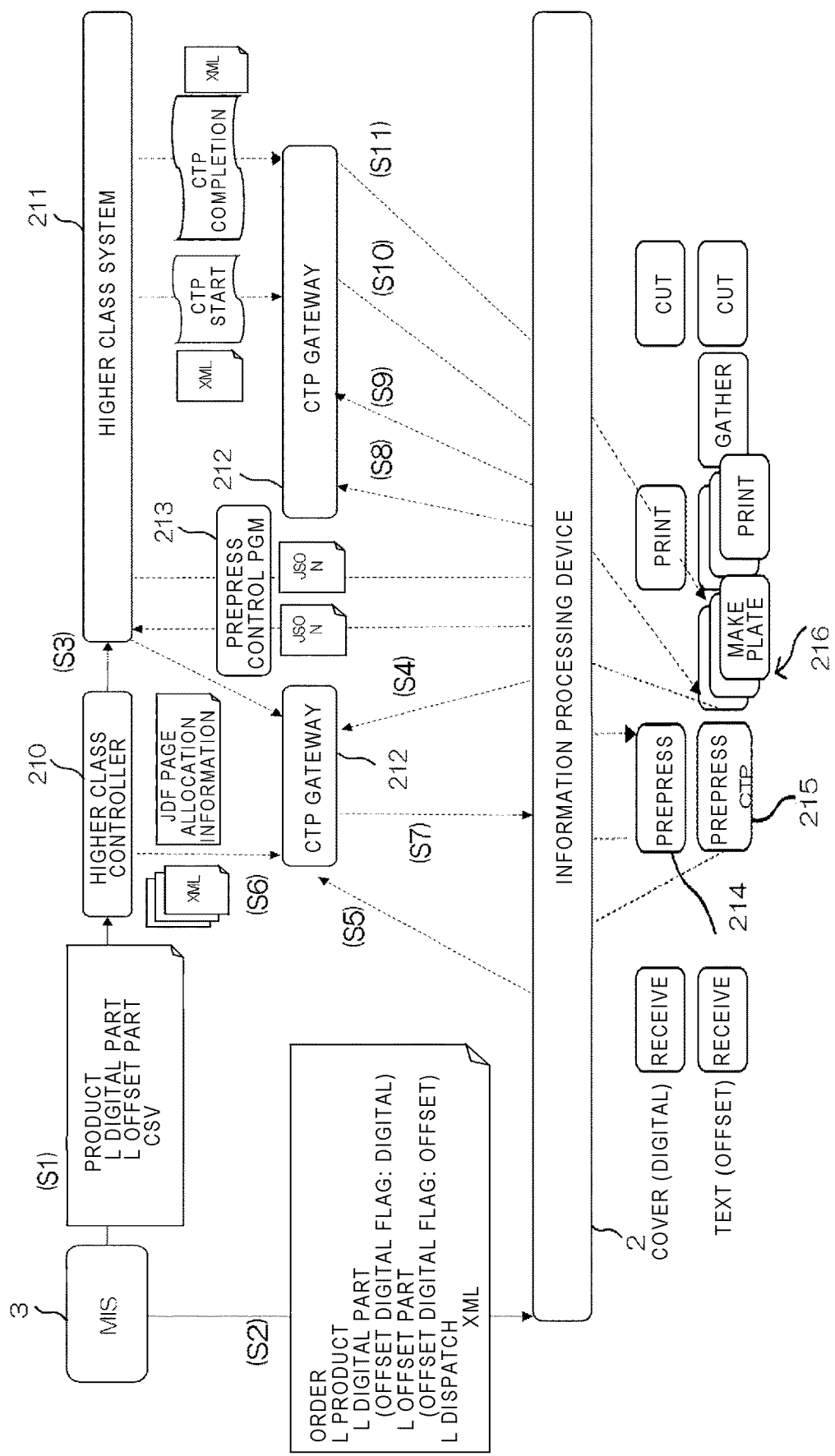
FIG. 10 illustrates a method of managing plural printing plate parts according to the exemplary embodiment.

FIG. 10 illustrates the method of managing the plural printing plate parts according to the present exemplary embodiment.

As described above, the CPU 20A functions as the creation unit 206. In the product workflow, the CPU 20A adds plural work objects related to the printing plate parts corresponding to the number of printing plates as management targets after the prepress is completed. When adding the plural work objects related to the printing plate parts corresponding to the number of printing plates as the management targets to the product workflow, the CPU 20A adds the plural work objects so as to be distinguishable from the plural work objects related to the parts constituting the print product. That is, by managing the printing plate parts separately from the parts constituting the print product, the printing plate parts and the parts of the print product are prevented from being mixed.

In FIG. 10, a higher level controller 210 and a higher level system 211 are implemented as, for example, the prepress systems 5A and 5B illustrated in FIG. 2 described above. Here, it is assumed, for example, that a cover of the print product is generated by the digital printing (digital) and that a text of the print product is generated by the offset printing (off). For each of the cover (digital) and the text (off), "receive" indicates a work object of the receiving process, "prepress" indicates a work object of the prepress process, "make plate" indicates a work object of the plate making process, "print" indicates a work object of the printing process, "gather" indicates a work object of the gathering process, and "cut" indicates a work object of a cutting process. Particularly, prepress 214 represents a work object of the prepress process corresponding to the digital printing. Prepress 215 represents a work object of the prepress process corresponding to the offset printing by CTP. Plate making 216 represents a work object of the plate making process of generating the printing plate parts corresponding to the number of printing plates obtained as a result of the prepress 215.

In (S1) in FIG. 10, the MIS 3 transmits product information described in a comma separated value (CSV) format to the higher level controller 210. The product information includes information on a part to be digital printed (hereinafter referred to as a "digital part") and information on a part to be offset printed (hereinafter referred to as an "offset part"). In the higher level controller 210, the information on the digital part is manually deleted.

In (S2), the MIS 3 transmits the order information described in the XML format to the information processing device 2. The order information includes the product information, dispatching information, and the like. The product information includes, as described above, the information on the digital part and the information on the offset part. Upon receipt of the order information from the MIS 3, the information processing device 2 completes the reception of the order related to the print product.

In (S3), the higher level controller 210 instructs the higher level system 211 to prepress the offset part.

In (S4), the information processing device 2 instructs a CTP gateway 212 to wait for the prepress.

In (S5), the information processing device 2 transmits the order information and the like to the CTP gateway 212 via a proxy.

In (S6), the CTP gateway 212 acquires a color plate status described in the XML format from the higher level controller 210 by polling, and acquires page allocation information described in a JDF format from the higher level system 211 by polling. The page allocation information is information representing a layout of a page.

In (S7), the CTP gateway 212 inputs the part information to the information processing device 2 via the proxy. The information processing device 2 completes the prepress 215 at a timing at which the part information is input from the CTP gateway 212. Then, when the prepress 215 is completed, the printing plate parts corresponding to the number of printing plates obtained as the result of the prepress 215 are added. That is, the plate making 216 corresponding to the number of printing plate parts is added.

Meanwhile, between the information processing device 2 and the higher level system 211, information described in a javascript (registered trademark) object notation (JSON) format is exchanged via a prepress control PGM (program) 213, and the prepress of the digital part is instructed. As a result, the prepress 214 is completed.

In (S8), the information processing device 2 instructs the CTP gateway 212 to wait for the plate making.

In (S9), the information processing device 2 transmits the part information on the printing plate part to the CTP gateway 212 via the proxy. The CTP gateway 212 acquires information that indicates a CTP start and that is described in the XML format from the higher level system 211.

In (S10), the CTP gateway 212 transmits a plate making start status to the information processing device 2 via the proxy. The CTP gateway 212 acquires information that indicates CTP completion and that is described in the XML format from the higher level system 211.

In (S11), the CTP gateway 212 transmits a plate making completion status to the information processing device 2 via the proxy.

Figure 11A:
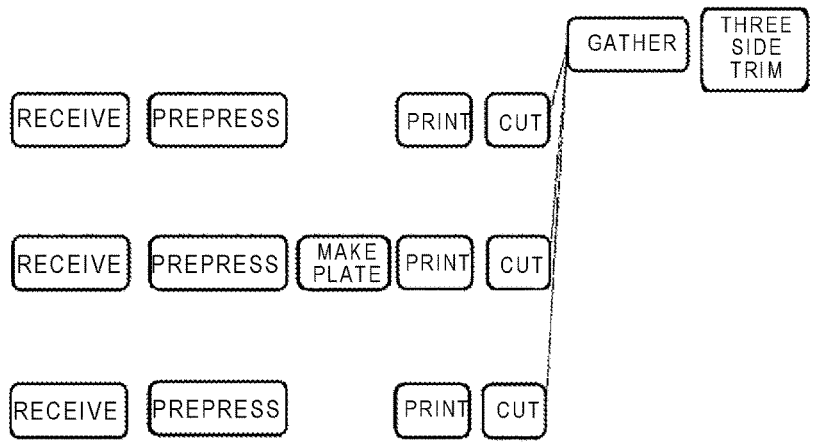
FIG. 11A illustrates an example of a structure of a product workflow template before prepress according to the exemplary embodiment.

FIG. 11A illustrates an example of a structure of a product workflow template before the prepress according to the present exemplary embodiment. FIG. 11B illustrates an example of a structure of a product workflow after the prepress according to the present exemplary embodiment. "Receive" indicates the work object of the receiving process, "prepress" indicates the work object of the prepress process, "make plate" indicates the work object of the plate making process, "print" indicates the work object of the printing process, "cut" indicates the work object of the cutting process, "gather" indicates the work object of the gathering process, and "three" indicates a work object of a three-side trimming process.

In the product workflow template illustrated in FIG. 11A, for a part represented by "cover Seq1", the receiving process, the prepress process, the printing process, and the cutting process are generated as work objects. For a part represented by "text Seq2", the receiving process, the prepress process, the plate making process, the printing process, and the cutting process are generated as work objects. In the "text Seq2", "CTP" is selected in the prepress process. For a part represented by "dust jacket Seq3", the receiving process, the prepress process, the printing process, and the cutting process are generated as the work objects.

Figure 11B:
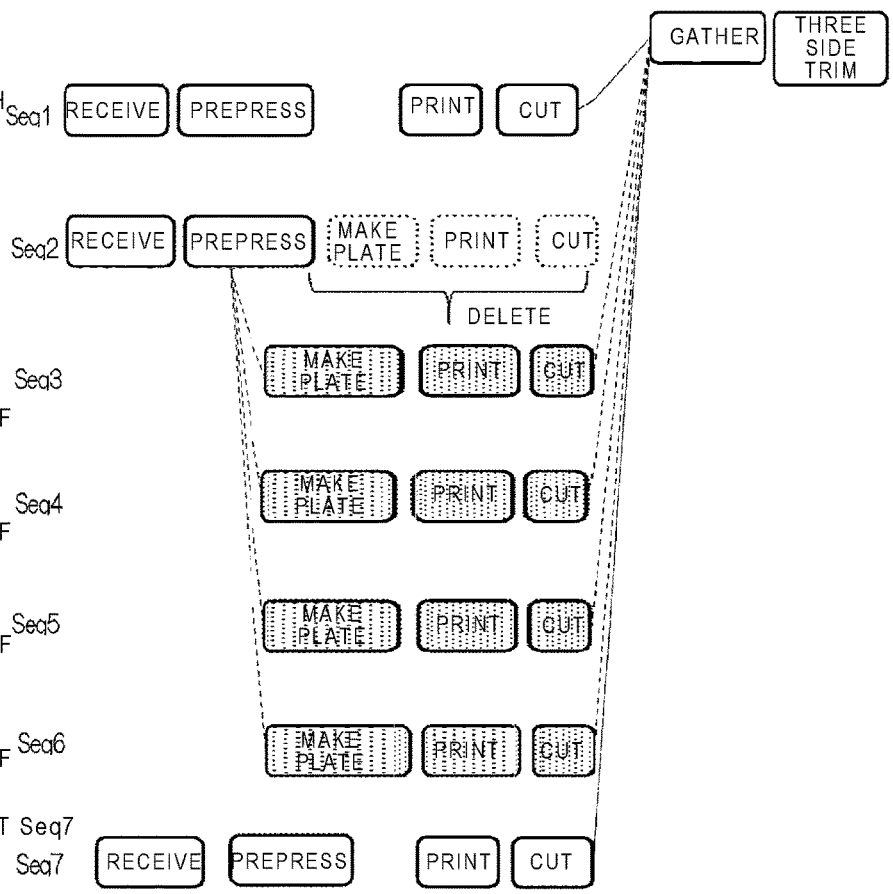
FIG. 11B illustrates an example of a structure of a product workflow after the prepress according to the exemplary embodiment.

In the product workflow illustrated in FIG. 11B, it is assumed that four printing plate parts are required for a "text" to be offset printed based on the result of the prepress. In this case, for the part "text Seq2", the work objects of the plate making process, the printing process, and the cutting process are deleted. Then, work objects for a "text Seq3", a "text Seq4", a "text Seq5", and a "text Seq6" corresponding to the printing plate parts are added. Specifically, work objects of a plate making process, a printing process, and a cutting process for the "text Seq3" are generated in association with the prepress process for the "text Seq2". The same applies to the "text Seq4", the "text Seq5", and the "text Seq6". Then, the "dust jacket Seq3" is changed to a "dust jacket Seq7".

In this way, according to the present exemplary embodiment, when there is a part to be offset printed, work objects for printing plate parts corresponding to the number of printing plates obtained as a result of the prepress are generated. Therefore, the plural printing plates can be easily managed as compared to a case in which the plural printing plates in the offset printing are managed as a single part.

Second Exemplary Embodiment

The present exemplary embodiment describes a case in which intermediate parts are grouped based on a grouping state of parts constituting the intermediate parts.

Specifically, when processes are grouped in processing an intermediate part, a grouping process similar to a grouping state of any of the parts constituting the intermediate part is performed based on grouping information on each part. Particularly, when there is a part including a printing process using roll paper, a group for processing the intermediate part is set such that the grouping is the same as the grouping state of the part using the roll paper.

Figure 12:
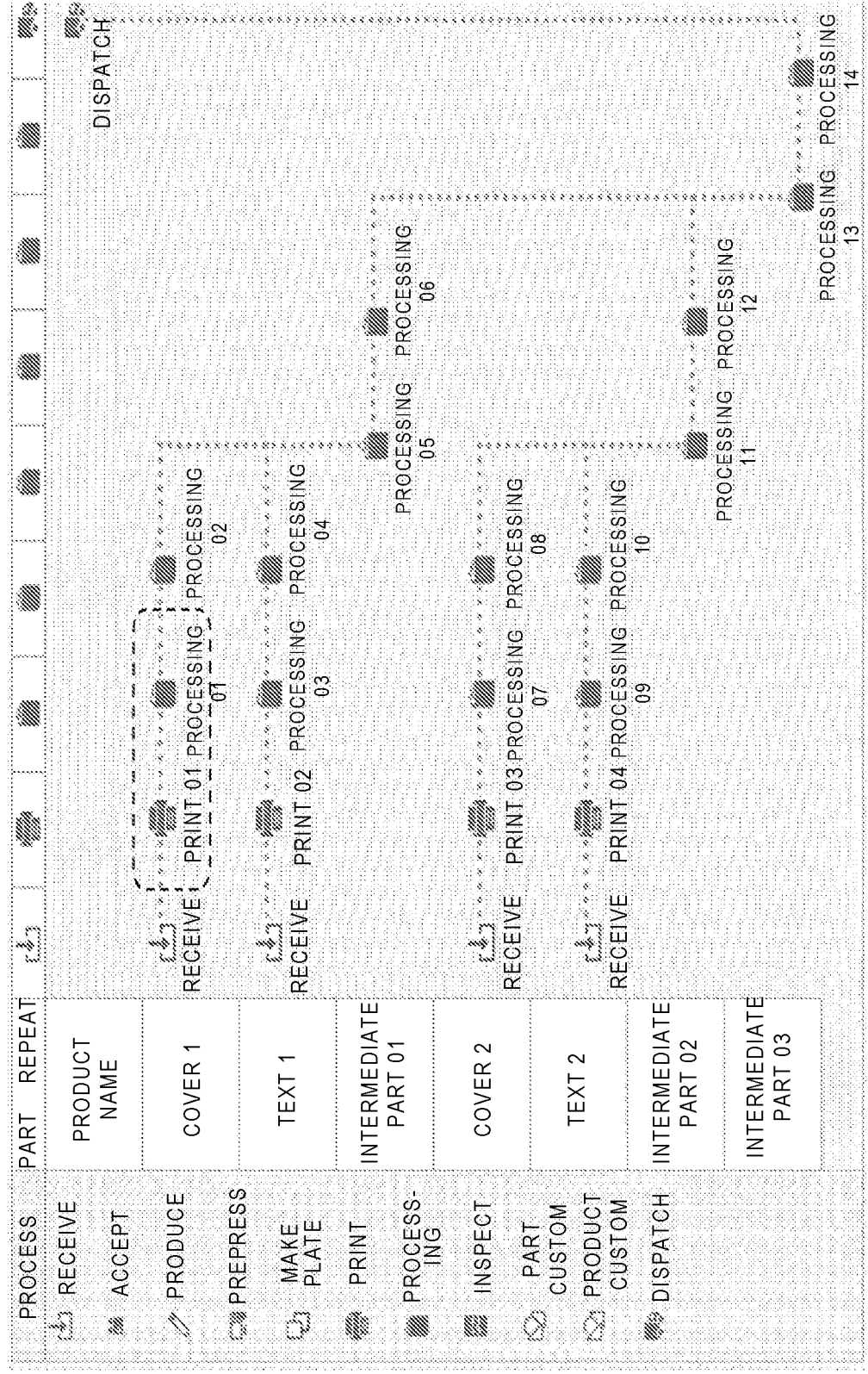
FIG. 12 illustrates an example of a product workflow display region according to the exemplary embodiment.

FIG. 12 illustrates an example of a product workflow display region 220 according to the present exemplary embodiment.

In the product workflow display region 220 illustrated in FIG. 12, a product workflow is displayed. For example, for "processing 02", processing is grouped such that a group includes "print 01". For "processing 04", processing is grouped such that a group includes "print 02". Then, for "processing 05" represented as an "intermediate part 01", it is possible to select whether to group processing such that a group includes the "print 01" or to group processing such that a group includes the "print 02". Here, an ID of the printing process that a previous processing process refer to is referred to. As a prohibition process, when there is no printing process referenced by the previous processing step, a processing grouping check is grayed out.

Similarly, for "processing 09", processing is grouped such that a group includes "print 04". Then, for "processing 13" represented as an "intermediate part 03", it is possible to select whether to group processing such that a group includes the "print 02" or to group processing such that a group includes the "print 04".

It is noted that the "processing 01" and the "processing 02" can only refer to the "print 01". It is impossible that the "processing 02" refers to the "print 01" unless the "processing 01" refers to the "print 01". It is possible that the "processing 01" refers to the "print 01" and the "processing 02" does not refer to the "print 01". When the "processing 01" and the "processing 02" refer to the printing, the "processing 01" and the "processing 02" have the same value.

"Processing 05" and "processing 06" can only refer to a printing process that the "processing 02" and "processing 04" refer to. That is, none of the "processing 05" and "processing 06" can refer to the "print 03" and the "print 04". It is impossible that the "processing 06" refers to the "print 01" or the "print 02" unless the "processing 05" refers to the "print 01" or the "print 02". It is possible that the "processing 05" refers to the "print 01" or the "print 02" and the "processing 06" does not refer to the printing process. When both the "processing 05" and the "processing 06" refer to printing processes, printing process IDs are set to the same value (either "print 01" or "print 02").

"Processing 13" and "processing 14" can refer only to a printing process that the "processing 06" or "processing 12" refer to. When both the "processing 13" and the "processing 14" refer to the printing process, the printing process IDs are set to the same value.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the exemplary embodiments above, and may be changed.

In the above, the information processing device according to the exemplary embodiment has been exemplified. The exemplary embodiments may be implemented in a form of a program that causing a computer to execute functions of respective elements included in the information processing device. The exemplary embodiments may be in a form of a non-transitory computer readable storage medium storing the program.

The configuration of the information processing devices described in the above-described exemplary embodiments are examples, and may be changed depending on situations without departing from a gist.

The flow of the program described in the above-described exemplary embodiment is also an example. For example, an unnecessary step may be deleted, a new step may be added, or the processing order may be changed without departing from the gist.

The above-described exemplary embodiments have described cases in which the processing according to the exemplary embodiments are implemented with a software configuration by using the computer to execute the program, and the present disclosure is not limited thereto. The exemplary embodiments may be implemented by, for example, a hardware configuration or a combination of the hardware configuration and the software configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
 a processor configured to:
  specify a plurality of parts for manufacturing an ordered product;
  specify a plurality of processes required from receiving an order of the product to completion of the product using the plurality of parts;
  for an intermediate part generated by processing at least two of the plurality of parts, generate an intermediate object indicating the intermediate part;
  for each of the plurality of parts, generate work objects indicating processes required for manufacturing the part,
  for a part to be manufactured by offset printing among the plurality of parts, generate work objects that treat printing plate parts corresponding to the number of printing plates obtained as a result of prepress as parts; and create workflow information that
displays a list of the plurality of parts, and concurrently displays, for each respective one of the plurality of parts displayed in the list, the work objects indicating the corresponding processes required for manufacturing the respective part in an order of the processes, and
relates and displays, for each respective one of the plurality of parts, the work objects indicating the corresponding processes that are to be executed continuously, wherein in the workflow information, the intermediate object indicating the intermediate part is associated with the work objects for the at least two parts used to generate the intermediate part, wherein the processor is configured to:
acquire manufacturing information for manufacturing the ordered product;
extract matching template information that matches the manufacturing information from a storage based on the acquired manufacturing information, the storage storing a plurality of pieces of template information in which
for each of the plurality of parts, the work objects indicating the processes required for manufacturing each part are related in the order of a plurality of works,
for each of the plurality of parts, the work objects indicating the processes executed continuously are related, and
the intermediate object indicating the intermediate part is associated with the work objects; and
specify the plurality of parts for manufacturing the ordered product and the plurality of processes required before the product is completed, using the extracted matching template, generate the intermediate object indicating the intermediate part and the work objects, and create the workflow information.

2. The information processing device according to claim 1, wherein
the processor is configured to add, to the workflow information, the plurality of work objects related to the printing plate parts corresponding to the number of printing plates as management targets after the prepress is completed.

3. The information processing device according to claim 2, wherein
the processor is configured to
when adding, to the workflow information, the plurality of work objects related to the printing plate parts corresponding to the number of printing plates as the management targets, add the plurality of work objects related to the printing plate parts so as to be distinguishable from the plurality of work objects related to the parts constituting the product.

4. The information processing device according to claim 1, wherein
the intermediate object comprises
an intermediate processing object indicating the processing for the at least two parts, and
an intermediate work object indicating a work for the generated intermediate part.

5. The information processing device according to claim 2, wherein the intermediate object comprises
an intermediate processing object indicating the processing for the at least two parts, and
an intermediate work object indicating a work for the generated intermediate part.

6. The information processing device according to claim 3, wherein
the intermediate object comprises
an intermediate processing object indicating the processing for the at least two parts, and
an intermediate work object indicating a work for the generated intermediate part.

7. The information processing device according to claim 1, wherein
the processor is configured to:
create display information for displaying the workflow information on a display; and
output the created display information to the display.

8. The information processing device according to claim 2, wherein
the processor is configured to:
create display information for displaying the workflow information on a display; and
output the created display information to the display.

9. The information processing device according to claim 3, wherein
the processor is configured to:
create display information for displaying the workflow information on a display; and
output the created display information to the display.

10. The information processing device according to claim 4, wherein
the processor is configured to:
create display information for displaying the workflow information on a display; and
output the created display information to the display.

11. The information processing device according to claim 5, wherein
the processor is configured to:
create display information for displaying the workflow information on a display; and
output the created display information to the display.

12. The information processing device according to claim 6, wherein
the processor is configured to:
create display information for displaying the workflow information on a display; and
output the created display information to the display.

13. A non-transitory computer readable medium storing a program that causes a computer to execute information processing, the information processing comprising:
specifying a plurality of parts for manufacturing an ordered product;
specifying a plurality of processes required from receiving an order of the product to completion of the product using the plurality of parts;
for an intermediate part generated by processing at least two of the plurality of parts, generating an intermediate object indicating the intermediate part;
for each of the plurality of parts, generating work objects indicating processes required for manufacturing the part,
for a part to be manufactured by offset printing among the plurality of parts, generating work objects that treat printing plate parts corresponding to the number of printing plates obtained as a result of prepress as parts; and creating workflow information that
    displays a list of the plurality of parts, and concurrently displays, for each respective one of the plurality of parts displayed in the list, the work objects indicating the corresponding processes required for manufacturing the respective part in an order of the processes, and
    relates and displays, for each respective one of the plurality of parts, the work objects indicating the corresponding processes that are to be executed continuously, wherein in the workflow information, the intermediate object indicating the intermediate part is associated with the work objects for the at least two parts used to generate the intermediate part,
wherein the information processing further comprises:
    acquiring manufacturing information for manufacturing the ordered product;
    extracting matching template information that matches the manufacturing information from a storage based on the acquired manufacturing information, the storage storing a plurality of pieces of template information in which
        for each of the plurality of parts, the work objects indicating the processes required for manufacturing each part are related in the order of a plurality of works,
        for each of the plurality of parts, the work objects indicating the processes executed continuously are related, and
        the intermediate object indicating the intermediate part is associated with the work objects; and
    specifying the plurality of parts for manufacturing the ordered product and the plurality of processes required before the product is completed, using the extracted matching template, generating the intermediate object indicating the intermediate part and the work objects, and creating the workflow information.

14. A method of executing information processing, comprising:
    specifying a plurality of parts for manufacturing an ordered product;
    specifying a plurality of processes required from receiving an order of the product to completion of the product using the plurality of parts;
    for an intermediate part generated by processing at least two of the plurality of parts, generating an intermediate object indicating the intermediate part;
    for each of the plurality of parts, generating work objects indicating processes required for manufacturing the part,
    for a part to be manufactured by offset printing among the plurality of parts, generating work objects that treat printing plate parts corresponding to the number of printing plates obtained as a result of prepress as parts; and
creating workflow information that
    displays a list of the plurality of parts, and concurrently displays, for each respective one of the plurality of parts displayed in the list, the work objects indicating the corresponding processes required for manufacturing the respective part in an order of the processes, and
    relates and displays, for each respective one of the plurality of parts, the work objects indicating the corresponding processes that are to be executed continuously, wherein in the workflow information, the intermediate object indicating the intermediate part is associated with the work objects for the at least two parts used to generate the intermediate part,
wherein the method further comprises:
    acquiring manufacturing information for manufacturing the ordered product;
    extracting matching template information that matches the manufacturing information from a storage based on the acquired manufacturing information, the storage storing a plurality of pieces of template information in which
        for each of the plurality of parts, the work objects indicating the processes required for manufacturing each part are related in the order of a plurality of works,
        for each of the plurality of parts, the work objects indicating the processes executed continuously are related, and
        the intermediate object indicating the intermediate part is associated with the work objects; and
    specifying the plurality of parts for manufacturing the ordered product and the plurality of processes required before the product is completed, using the extracted matching template, generating the intermediate object indicating the intermediate part and the work objects, and creating the workflow information.

\* \* \* \* \*